US010031508B2

(12) United States Patent
Tanizawa et al.

(10) Patent No.: US 10,031,508 B2
(45) Date of Patent: Jul. 24, 2018

(54) MACHINE TOOL

(71) Applicant: MITSUBISHI HEAVY INDUSTRIES MACHINE TOOL CO., LTD., Ritto-shi, Shiga (JP)

(72) Inventors: Yusuke Tanizawa, Tokyo (JP); Hideaki Yamamoto, Tokyo (JP)

(73) Assignee: MITSUBISHI HEAVY INDUSTRIES MACHINE TOOL CO., LTD., Ritto-shi (JP)

( * ) Notice: Subject to any disclaimer, the term of this patent is extended or adjusted under 35 U.S.C. 154(b) by 147 days.

(21) Appl. No.: 14/914,522

(22) PCT Filed: May 26, 2014

(86) PCT No.: PCT/JP2014/063781
§ 371 (c)(1),
(2) Date: Feb. 25, 2016

(87) PCT Pub. No.: WO2015/029517
PCT Pub. Date: Mar. 5, 2015

(65) Prior Publication Data
US 2016/0209826 A1 Jul. 21, 2016

(30) Foreign Application Priority Data

Aug. 27, 2013 (JP) .................................. 2013-175233

(51) Int. Cl.
*B23Q 15/24* (2006.01)
*B23Q 17/24* (2006.01)
(Continued)

(52) U.S. Cl.
CPC ........... *G05B 19/402* (2013.01); *B23Q 15/24* (2013.01); *B23Q 17/2471* (2013.01); *G05B 19/404* (2013.01); *G05B 2219/49113* (2013.01)

(58) Field of Classification Search
CPC .. B23Q 15/24; B23Q 17/2471; G05B 19/402; G05B 19/404; G05B 2219/49113
See application file for complete search history.

(56) References Cited

U.S. PATENT DOCUMENTS 6,293,742 B1 * 9/2001 Miyagi ................... B23B 23/00
29/40
9,120,161 B2 * 9/2015 Yoshimoto .............. B23B 49/04
(Continued)

FOREIGN PATENT DOCUMENTS

EP 0435239 A2 * 7/1991 ............. G05B 19/39
EP 2065771 A2 * 6/2009 ........... G05B 19/404
(Continued)

OTHER PUBLICATIONS

International Search Report with Written Opinion of the International Search Authority of International Application No. PCT/JP2014/063781 dated Jul. 15, 2014 with English Translation.
(Continued)

*Primary Examiner* — Jennifer L Norton
(74) *Attorney, Agent, or Firm* — Birch, Stewart, Kolasch & Birch, LLP

(57) ABSTRACT

This machine tool is provided with an arithmetic control unit that: controls a motor so as to measure the positions of raw material holes in a boom using an imaging camera held on a main shaft (S111-S113); calculates the positions of the center axes of the raw material holes on the basis of the information about the positions of the raw material holes captured by the imaging cameras (S114, S115); calculates distances between two center axes of interest (S116); and, when at least one of the calculated distances does not meet a prescribed value (S117), calculates the most suitable positions for process holes from minimum holes that comply with formulae (1111-1) to (1114-1) and (1141-1) to (1144-1) on the basis of equations (1101), (1111) to (1114), and
(Continued)

(1141) to (1144) (S121); and controls the motor so as to form process holes in the positions calculated as the most suitable and cuts raw material holes using a tool held on the main shaft (S122, S123).

4 Claims, 11 Drawing Sheets

(51) Int. Cl.
    *G05B 19/402*     (2006.01)
    *G05B 19/404*     (2006.01)

(56) References Cited

U.S. PATENT DOCUMENTS

| | | | |
|---|---|---|---|
| 2005/0203661 A1 | 9/2005 | Hollingshead et al. | |
| 2008/0114485 A1* | 5/2008 | Katoh | G05B 19/404 700/193 |
| 2009/0213216 A1* | 8/2009 | Hastilow | G05B 19/401 348/142 |
| 2011/0093115 A1* | 4/2011 | Katoh | G05B 19/404 700/191 |
| 2011/0270436 A1* | 11/2011 | Katoh | G05B 19/402 700/160 |
| 2014/0297022 A1* | 10/2014 | Uenishi | G05B 19/404 700/160 |
| 2016/0239949 A1* | 8/2016 | Ogawa | G06K 9/6204 |
| 2016/0246282 A1* | 8/2016 | Matsushita | G05B 19/404 |
| 2018/0029186 A1* | 2/2018 | Roders | B23Q 17/22 |

FOREIGN PATENT DOCUMENTS

| | | | | |
|---|---|---|---|---|
| EP | 2071422 A2 * | 6/2009 | | G05B 19/404 |
| EP | 2570236 A1 * | 3/2013 | | G05B 19/402 |
| GB | 941104 A | 11/1963 | | |
| JP | 2006-102843 A | 4/2006 | | |

OTHER PUBLICATIONS

Chinese Office Action dated Nov. 30, 2016 received in corresponding Chinese Application No. 201480047076.8 with an English Translation.

* cited by examiner

MACHINE TOOL

TECHNICAL FIELD

The present invention relates to a machine tool.

BACKGROUND ART

The boom of, for example, an excavator sometimes includes a pair of plate members which are disposed in mutually facing postures and in each of which a plurality of holes are formed at predetermined positions for pivotally supporting an arm, a hydraulic cylinder, and the like, and a joint member joining and fixing the plate members to each other. In the case of such a boom, shafts cannot be inserted and supported in the mutually facing holes if the axes of these mutually facing holes are offset from each other. For this reason, after the plate members are disposed in the mutually facing postures and joined and fixed to each other with the joint member, mutually facing blank holes in the plate members are cut to expand their diameters with, for example, a horizontal boring and milling machine with counter spindles or the lie, so that the blank holes are worked and adjusted into worked holes positioned coaxially with each other.

CITATION LIST

Patent Literature

Patent Literature 1: Japanese Patent Application Publication No. 2006-102843

SUMMARY OF INVENTION

Technical Problem

In the case of the boom of an excavator as mentioned above, when the mutually facing blank holes are worked and adjusted into coaxially positioned worked holes, an error greater than or equal to a prescribed value (tolerance) may be present in the distance (pitch) between the axis of one worked hole and the axis of another worked hole. In this case, a hydraulic cylinder or the like cannot be joined between these worked holes, which makes the boom a defective product.

Such a problem is not limited to the case mentioned above where the mutually facing blank holes in the boom of an excavator are worked and adjusted into worked holes by cutting the blank holes to expand their diameters with a horizontal boring and milling machine with counter spindles or the like. The problem possibly occurs like the above case when n blank holes (n is an integer greater than or equal to 3) formed in a workpiece are to be worked and adjusted into worked holes by cutting the blank holes to expand their diameters with a machine tool.

In view of the above, an object of the present invention is to provide a machine tool capable of working and adjusting n blank holes (n is an integer greater than or equal to 3) formed in a workpiece into worked holes by cutting the blank holes to expand their diameters such that the blank holes are worked and adjusted to such optimized positions that the pitch error between the worked holes can be less than or equal to a tolerance.

Solution to Problem

A machine tool according to the present invention for solving the above problem is a machine tool for working and adjusting n blank holes (n is an integer greater than or equal to 3) formed in a workpiece into worked holes by cutting the blank holes to expand diameters thereof, characterized in that the machine tool comprises: a table on which the workpiece is placed; a spindle capable of detachably holding a tool for cutting the blank holes in the workpiece and measurement means for measuring positions of the blank holes in the workpiece such that the tool and the measurement means are capable of being changed from one another; spindle drive means for rotationally driving the spindle; relative movement means for moving at least one of the table and the spindle to move the tool and the measurement means relative to the workpiece in an X-axis direction, a Y-axis direction, and a Z-axis direction; and arithmetic control means for controlling the relative movement means such that the positions of the blank holes in the workpiece are measured with the measurement means held on the spindle, calculating positions of center axes of the blank holes based on information on the positions of the blank holes measured with the measurement means, calculating a distance between each two center axes of interest among the center axes, in a case where at least one of the calculated distances does not satisfy a prescribed value, calculating optimized positions of the worked holes from minimized values satisfying Inequalities (110-1), (120-1), (130-1), (140-1), (150-1) below based on Equations (100), (110), (120), (130), (140), (150) below, and controlling the spindle drive means and the relative movement means to cut the blank holes with the tool held on the spindle such that the worked holes are formed at the calculated optimized positions of the worked holes.

[Formula 1]

$$Fn(OX_1, OX_2, \ldots, OX_n, OY_1, OY_2, \ldots OY_n) = \quad (100)$$

$$\frac{1}{2} * \sum_{k=1}^{n} \sum_{\substack{m=1 \\ m \neq k}}^{n} (WP_{km} * \Delta P_{km}^2 + WX_{km} * \Delta X_{km}^2 + WY_{km} * \Delta Y_{km}^2) +$$

$$\sum_{k=1}^{n} (WQ_k * \Delta Q_k^2 + WT_k * \Delta T_k^2)$$

$$\Delta P_{km} = \sqrt{(OX_m - OX_k)^2 + (OY_m - OY_k)^2} - P_{km} \quad (110)$$

$$\Delta P_{km} \leq EP_{km} \quad (110\text{-}1)$$

$$\Delta X_{km} = (OX_m - OX_k) - (OX_{ms} - OX_{ks}) \quad (120)$$

$$\Delta X_{km} \leq EX_{km} \quad (120\text{-}1)$$

$$\Delta Y_{km} = (OY_m - OY_k) - (OY_{ms} - OY_{ks}) \quad (130)$$

$$\Delta Y_{km} \leq EY_{km} \quad (130\text{-}1)$$

$$\Delta Q_k = \sqrt{(OX_k - MX_{ki})^2 + (OY_k - MY_{ki})^2} \quad (140)$$

$$\Delta Q_k \leq EQ_k \quad (140\text{-}1)$$

$$\Delta T_k = \sqrt{(OX_k - MX_{ko})^2 + (OY_k - MY_{ko})^2} \quad (150)$$

$$\Delta T_k \leq ET_k \quad (150\text{-}1)$$

Here, $MX_{ki}$ is a position of a center axis of a blank hole $G_k$ in the X-axis direction, $MY_{ki}$ is a position of the center axis of the blank hole $G_k$ in the Y-axis direction, $MX_{ko}$ is a position, in the X-axis direction, of a center axis of a circular area where a worked hole $H_k$ is capable of being formed by working and adjusting the blank hole $G_k$, $MY_{ko}$ is a position, in the Y-axis direction, of the center axis of the circular area where the worked hole $H_k$ can be formed by working and adjusting the blank hole $G_k$, $OX_k$ is a position of an axis of the worked hole $H_k$ in the X-axis direction, $OY_k$ is a position of the axis of the worked hole $H_k$ in the Y-axis direction, $OX_{ks}$ is a designed position of the axis of the worked hole $H_k$ in the X-axis direction, $OY_{ks}$ is a designed position of the axis of the worked hole $H_k$ in the Y-axis direction, $OX_m$ is a position of an axis of the worked hole $H_m$ in the X-axis direction, $OY_m$ is a position of the axis of the worked hole $H_m$ in the Y-axis direction, $OX_{ms}$ is a designed position of the axis of a worked hole $H_m$ in the X-axis direction, $OY_{ms}$ is a designed position of the axis of the worked hole $H_m$ in the Y-axis direction, $P_{km}$ is a designed pitch between the worked holes $H_k$, $H_m$, $\Delta P_{km}$ is a calculated pitch error between the worked holes $H_k$, $H_m$, $\Delta X_{km}$ is an axis-to-axis error between the worked holes $H_k$, $H_m$ in the X-axis direction, $\Delta Y_{km}$ is an axis-to-axis error between the worked holes $H_k$, $H_m$ in the Y-axis direction, $\Delta Q_k$ is an amount of offset between the center axis of the blank hole $G_k$ and the calculated axis of the worked hole $H_k$, $\Delta T_k$ is a length between the center axis of the circular area where the worked hole $H_k$ is capable of being formed and the calculated axis of the worked hole $H_k$, $EP_{km}$ is a tolerance for the pitch error between the worked holes $H_K$, $H_m$, $EX_{km}$ is a tolerance for the axis-to-axis error between the worked holes $H_k$, $H_m$ in the X-axis direction, $EY_{km}$ is a tolerance for the axis-to-axis error between the worked holes $H_k$, $H_m$ in the Y-axis direction, $EQ_k$ is a tolerance for the amount of offset between the center axis of the blank hole $G_k$ and the axis of the worked hole $H_k$, $ET_k$ is a tolerance for the length between the center axis of the circular area where the worked hole $H_k$ is capable of being formed and the axis of the worked hole $H_k$, $WP_{km}$ is a weight coefficient for $\Delta P_{km}$, $WX_{km}$ is a weight coefficient for $\Delta X_{km}$, $WY_{km}$ is a weight coefficient for $\Delta Y_{km}$, $WQ_k$ is a weight coefficient for $\Delta Q_k$, and $WT_k$ is a weight coefficient for $\Delta T_k$.

Also, the machine tool according to the present invention may be characterized in that, in the machine tool described above, the workpiece is a boom of an excavator.

Also, the machine tool according to the present invention may be characterized in that, in the machine tools described above, the machine tool is a horizontal boring and milling machine with counter spindles.

Also, the machine tool according to the present invention may be characterized in that, in the machine tools described above, the measurement means is anyone of an imaging camera and a touch sensor.

Advantageous Effects of Invention

Even in the case of a workpiece with a pitch error greater than or equal to its tolerance between worked holes, the machine tool according to the present invention can work and adjust the worked holes to such optimized positions that all the pitch errors can be less than or equal to their respective tolerances. In this way, defective products can be greatly reduced.

DESCRIPTION OF EMBODIMENTS

Embodiments of a machine tool according to the present invention will be described with reference to the drawings. However, the present invention is not limited only to the following embodiments to be described with reference to the drawings.

First Embodiment

A first embodiment of the machine tool according to the present invention will be described with reference to FIGS. 1 to 7.

Figure 1:
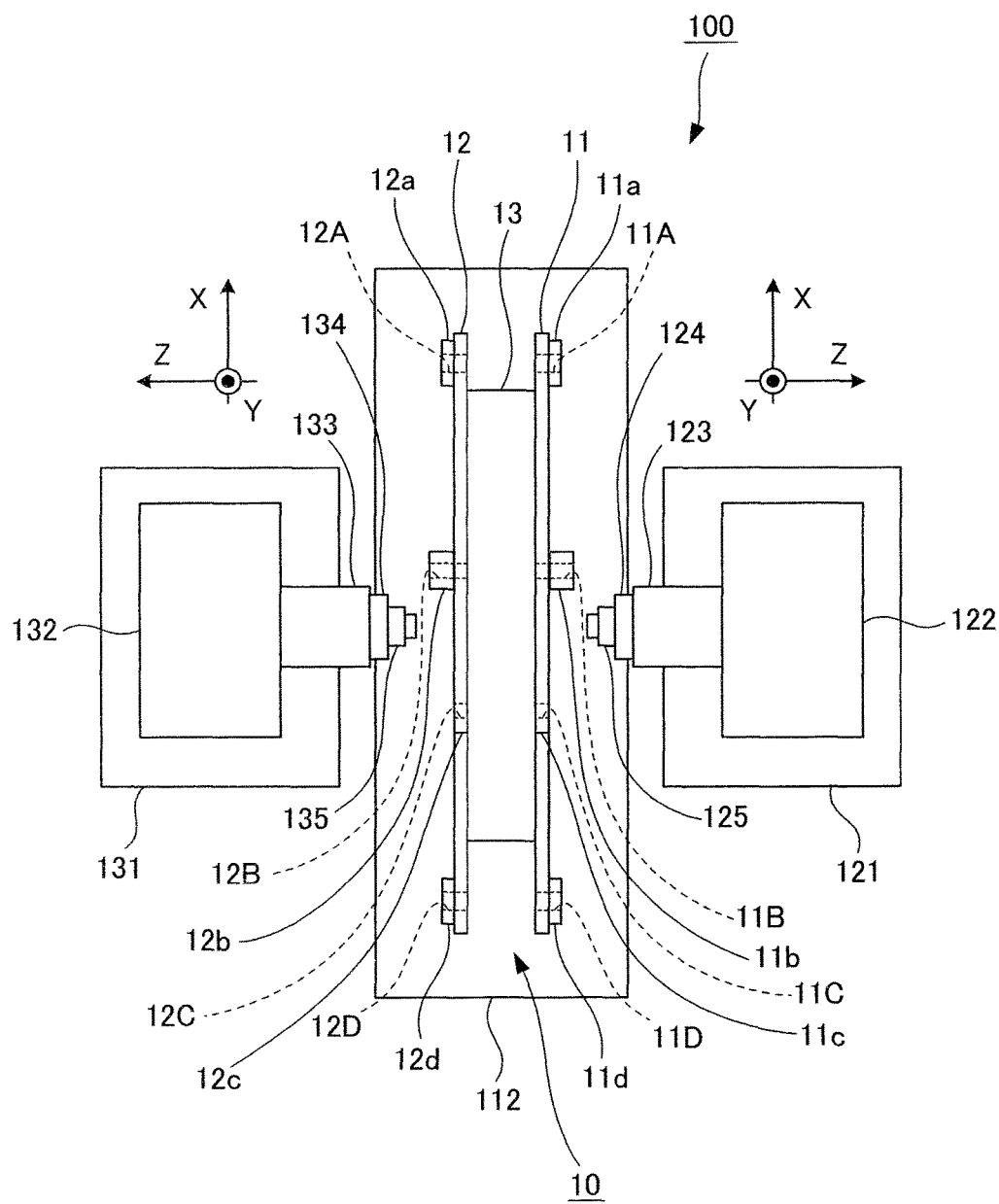
FIG. 1 is a plan view illustrating a schematic configuration of a main part of a first embodiment in which a machine tool according to the present invention is applied to a horizontal boring and milling machine with counter spindles.
Figure 2:
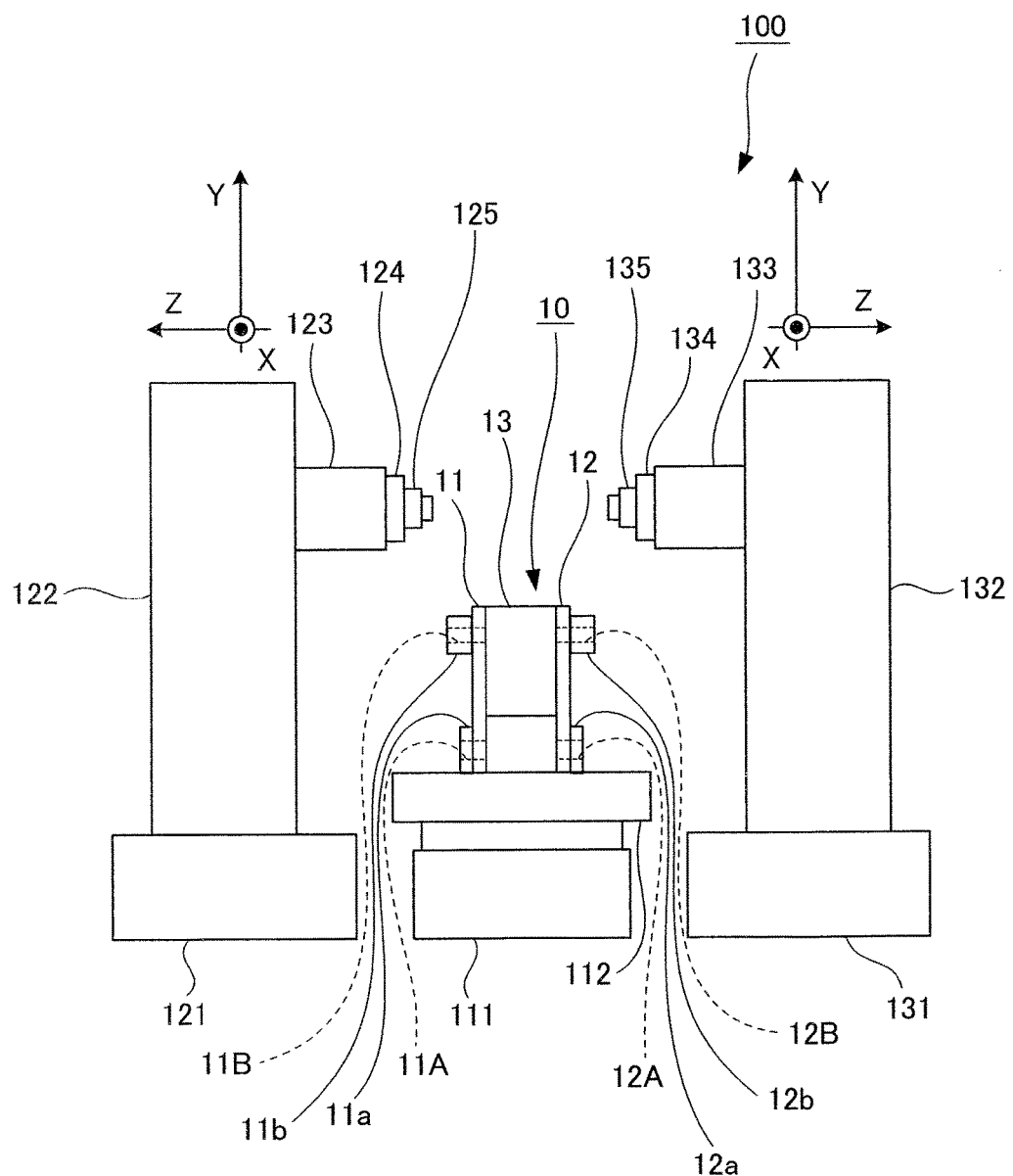
FIG. 2 is a front view illustrating a schematic configuration of a main part of the horizontal boring and milling machine with counter spindles in FIG. 1.

As illustrated in FIGS. 1 and 2, a table 112 is provided on a bed 111 slidably in an X-axis direction (the top-bottom direction of FIG. 1, the direction perpendicular to the plane of the sheet of FIG. 2). Columns 122, 132 are provided upright on beds 121, 131 which are placed by the opposite sides of the table 112 in its width direction (the left-right direction of FIGS. 1 and 2), respectively.

On the surfaces of the columns 122, 132 on the table 112 side, spindle heads 123, 133 are provided movably in an Y-axis direction, which is a vertical direction (the direction perpendicular to the plane of the sheet of FIG. 1, the top-bottom direction of FIG. 2), relative to these surfaces of the columns 122, 132, respectively. On the surfaces of the spindle heads 123, 133 on the table 112 side, spindles 124, 134 are provided, respectively, with their tips facing the table 112 side. The spindles 124, 134 are movable toward and away from their respective spindle heads 123, 133 in a Z-axis direction, which is their axial direction (the left-right direction of FIGS. 1 and 2).

Imaging cameras 125, 135, which serve as measurement means, are detachably attached to the spindles 124, 134, respectively. The spindles 124, 134 are each capable of holding any one of the imaging camera 125, 135 and a tool not illustrated for cutting or the like such as a milling cutter so that the imaging camera 125, 135 and the tool can be changed from one another.

Figure 3:
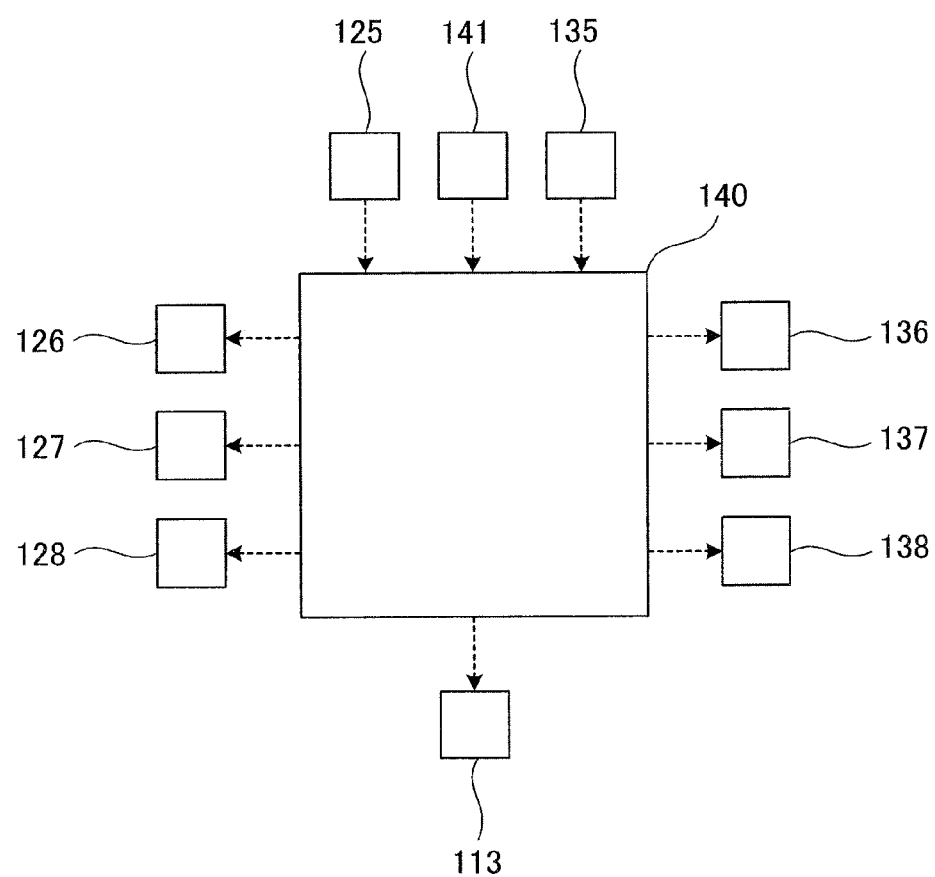
FIG. 3 is a control block diagram of the main part of the horizontal boring and milling machine with counter spindles in FIG. 1.

As illustrated in FIG. 3, the imaging cameras 125, 135 are electrically connected to an input part of an arithmetic control unit 140, which serves as arithmetic control means. An output part of the arithmetic control unit 140 is electrically connected to a drive motor 113 that moves the table 112 in the X-axis direction, to drive motors 126, 136 that move the spindle heads 123, 133 in the Y-axis direction, respectively, to drive motors 127, 137 that move the spindles 124, 134 forward and backward in the Z-axis direction, respectively, and to drive motors 128, 138 that rotationally drive the spindles 124, 134, respectively.

An input unit 141 that inputs various instructions is electrically connected to the input part of the arithmetic control unit 140. The arithmetic control unit 140 is capable of controlling the actuation of the drive motors 113, 126 to 128, 136 to 138 based on information from the input unit 141 and information inputted in advance, and of performing arithmetic operation for controlling the actuation of the drive motors 113, 126, 127, 136, 137 based on information from the imaging cameras 125, 135 and information inputted in advance (details will be described later).

Figure 4A:
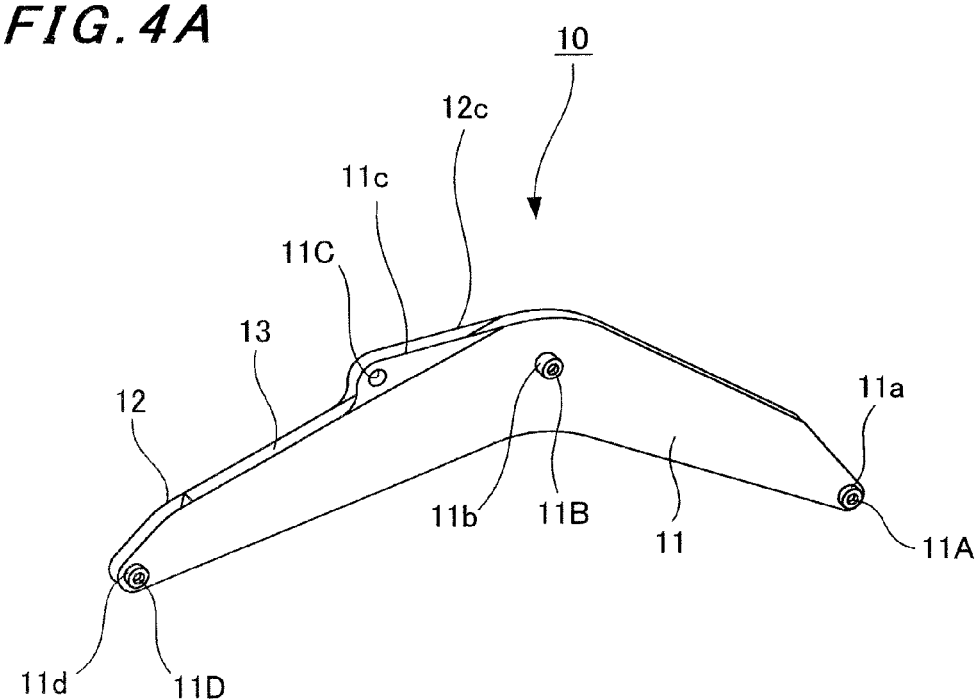
FIG. 4A is a schematic structure view of a boom of an excavator.
Figure 4B:
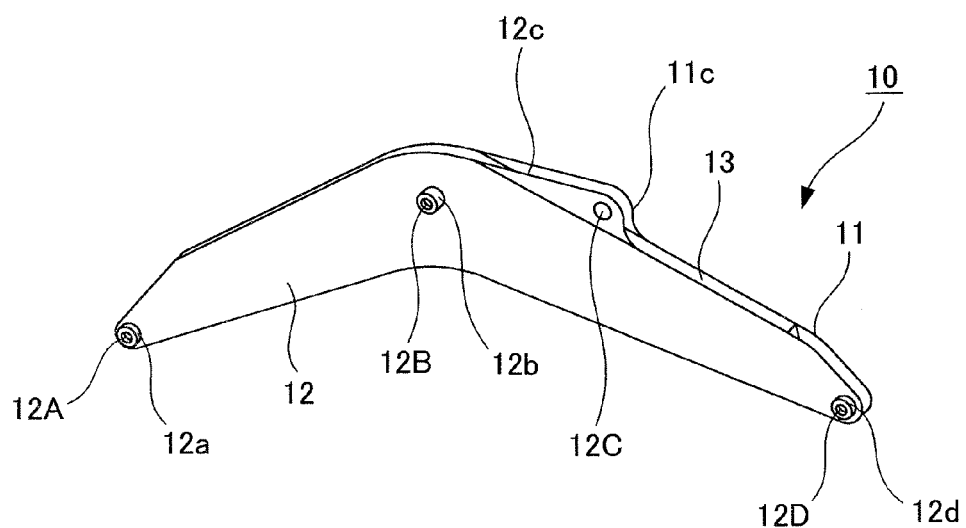
FIG. 4B is a schematic structure view of a boom of an excavato.

As illustrated in FIGS. 4A and 4B, a boom 10 of an excavator, which is a workpiece, includes a pair of plate members 11, 12 disposed in mutually facing postures, and a joint member 13 joining and fixing them to each other. A plurality of (four in this embodiment) blank holes 11A to 11D and a plurality of (four in this embodiment) of blank holes 12A to 12D for pivotally supporting an arm, hydraulic cylinders, and the like are formed in the plate members 11, 12 at predetermined positions, respectively.

The blank holes 11A, 11B, 11D, 12A, 123, 12D in the boom 10 are formed in (hollow) cylindrical protruding portions 11a, 11b, 11d, 12a, 12b, 12d, respectively, which protrude outward of the plate members 11, 12 in their thickness direction. The blank holes 11C, 12C in the boom 10 are formed in bracket portions 11c, 12c around their round protruding ends, respectively, the bracket portions 11c, 12c protruding in flush with the surfaces of the plate members 11, 12.

Note that, in this embodiment, components such as the columns 122, 132, the spindle heads 123, 133, the drive motors 113, 126, 127, 136, 137 constitute relative movement means, and components such as the drive motors 126, 138 constitute spindle drive means.

Next, description will be given of actuation of a machine tool 100 according to this embodiment as described above for working and adjusting the blank holes 11A to 11D, 12A to 12D in the boom 10 into worked holes 10A to 10D by cutting the blank holes 11A to 11D, 12A to 12D to expand their diameters.

Figure 5:
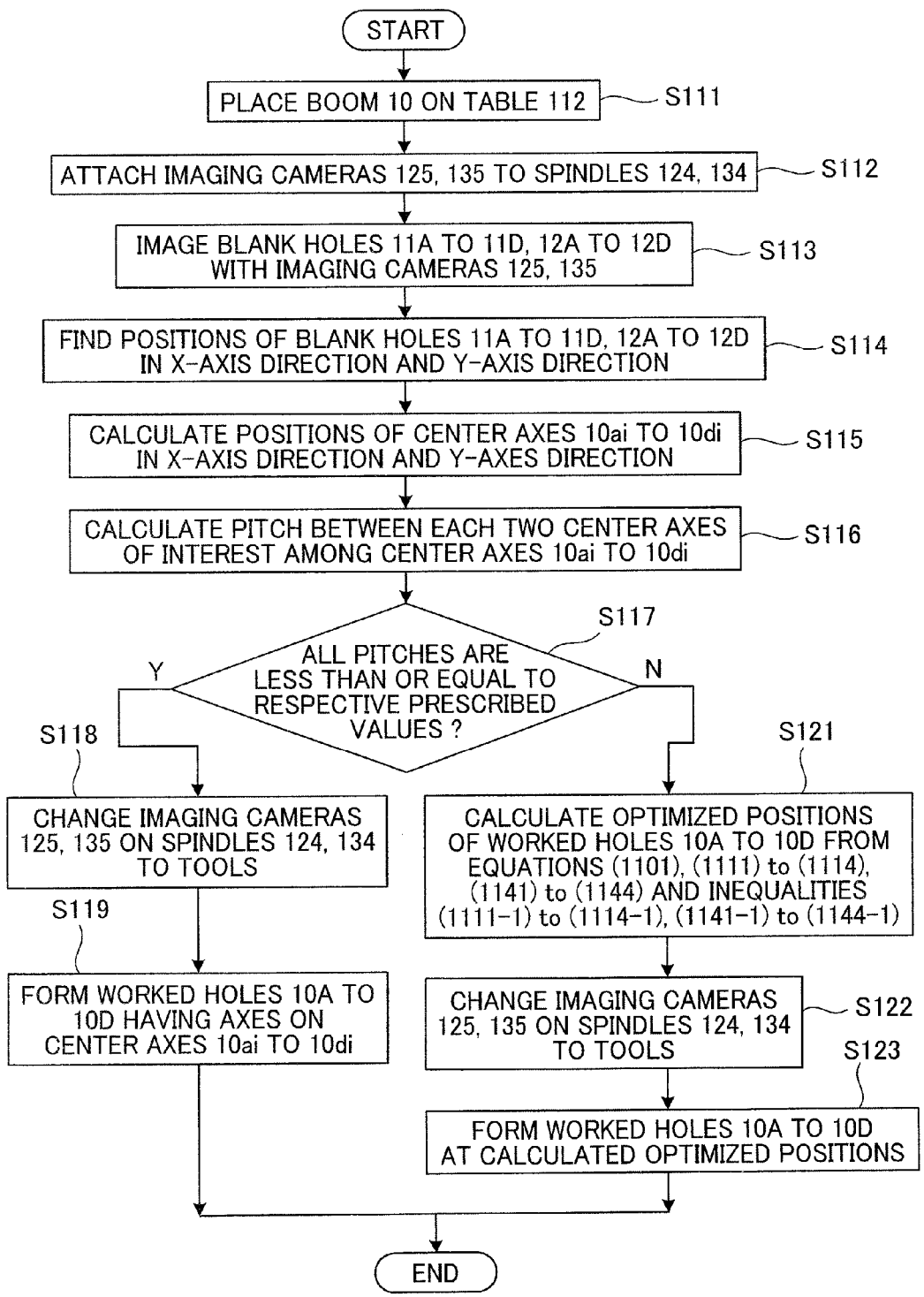
FIG. 5 is a flowchart of a main part of actuation of the horizontal boring and milling machine with counter spindles in the first embodiment.
Figure 6A:
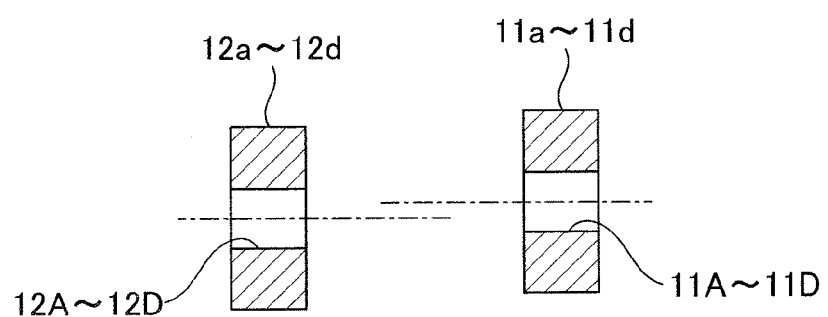
FIG. 6 is an explanatory view of the center axes of worked holes.
Figure 6B:
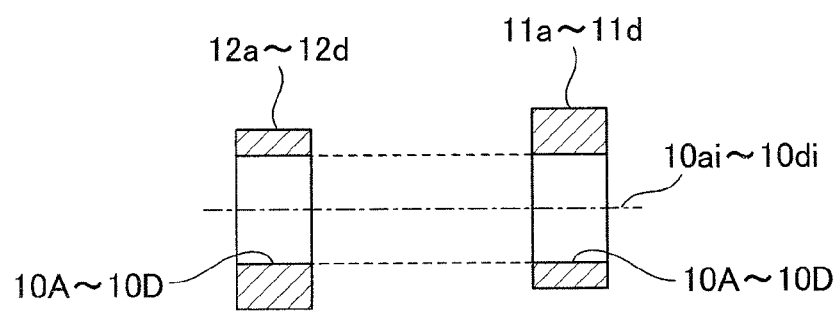

First, the boom 10 is placed at a prescribed position on the table 112 (S111 in FIG. 5), and the imaging cameras 125, 135 are attached to the spindles 124, 134 (S112 in FIG. 5).

Then, the input unit 141 inputs information into the arithmetic control unit 140 which instructs imaging of the blank holes 11A to 11D, 12A to 12D in the plate members 11, 12 of the boom 10 with the imaging cameras 125, 135. In response, the arithmetic control unit 140 actuates the drive motors 113, 126, 127, 136, 137 to move the table 112 in the X-axis direction and move the spindles 124, 134 in the Y-axis direction and the Z-axis direction such that the blank holes 11A to 11D, 12A to 12D in the plate members 11, 12 of the boom 10 can be imaged with the imaging cameras 125, 135 (S113 in FIG. 5).

Based on information from the imaging cameras 125, 135, the arithmetic control unit 140 finds the positions of the blank holes 11A to 11D, 12A to 12D in the plate members 11, 12 of the boom 10 in the X-axis direction and the Y-axis direction (S114 in FIG. 5).

Then, the arithmetic control unit 140 calculates the positions of such center axes $10ai$ to $10di$ in the X-axis direction and the Y-axis direction (see FIG. 6) that the mutually facing blank holes 11A to 11D, 12A to 12D in the plate members 11, 12 can be coaxial with each other with the smallest amounts of movement so that the positions of the mutually facing blank holes 11A to 11D, 12A to 12D in the X-axis direction and the Y-axis direction can coincide with each other, that is, the offset between their axes can be eliminated (S115 in FIG. 5).

Thereafter, the arithmetic control unit 140 calculates the distance (pitch) between each two center axes of interest among the center axes $10ai$ to $10di$, in particular, four pitches in total including the pitch between the center axes $10ai$, $10bi$, the pitch between the center axes $10bi$, $10ci$, the pitch between the center axes $10ci$, $10di$, the pitch between the center axes $10ai$, $10di$ (S116 in FIG. 5). The arithmetic control unit 140 then determines whether or not all of these pitches are less than or equal to their respective prescribed values (tolerances) (S117 in FIG. 5).

If all of the pitches are less than or equal to their respective prescribed values (tolerances), the imaging cameras 125, 135, which are attached to the spindles 124, 134, are changed to tools for cutting or the like such as milling cutters (S118 in FIG. 5).

Then, the arithmetic control unit 140 controls the actuation of the drive motors 113, 126, 127, 136, 137 to move the table 112 in the X-axis direction and move the spindles 124, 134 in the Y-axis direction and the Z-axis direction and controls the actuation of the drive motors 128, 138 to rotationally drive the spindles 124, 134 such that the blank holes 11A to 11D, 12A to 12D are worked and adjusted by cutting cut with the tools into worked holes 10A to 10D having their axes on the center axes $10ai$ to $10di$ (S119 in FIG. 5).

On the other hand, if even one of the pitches does not satisfy its prescribed value (tolerance), the arithmetic control unit 140 calculates minimized values satisfying Inequalities (1111-1) to (1114-1) (1141-1) to (1144-1) below based on Equations (1101), (1111) to (1114), (1141) to (1144) below, that is, the arithmetic control unit 140 calculates optimized positions of the center axes $10ai$ to $10di$ in the X-axis direction and the Y-axis direction, in other words, optimized positions of the axes of the worked holes 10A to 10D (S121 in FIG. 5).

$$F(OX_a, OX_b, OX_c, OX_d, OY_a, OY_b, OY_c, OY_d) = (WP_{AB} \times \Delta P_{AB}^2) + (WP_{BC} \times \Delta P_{BC}^2) + (WP_{CD} \times \Delta P_{CD}^2) + (WP_{AD} \times \Delta P_{AD}^2) + (WQ_A \times \Delta Q_A^2) + (WQ_B \times \Delta Q_B^2) + (WQ_C \times \Delta Q_C^2) + (WQ_D \times \Delta Q_D^2) \quad (1101)$$

$$\Delta P_{AB} = \{(OX_b - OX_a)^2 + (OY_b - OY_a)^2\}^{1/2} - P_{AB} \quad (1111)$$

$$\Delta P_{SC} = \{(OX_c - OX_b)^2 + (OY_c - OY_b)^2\}^{1/2} - P_{BC} \quad (1112)$$

$$\Delta P_{CD} = \{(OX_d - OX_c)^2 + (OY_d - OY_c)^2\}^{1/2} - P_{CD} \quad (1113)$$

$$\Delta P_{AD} = \{(OX_a - OX_d)^2 + (OY_a - OY_d)^2\}^{1/2} - P_{AD} \quad (1114)$$

$$\Delta P_{AB} \leq EP_{AB} \quad (1111-1)$$

$$\Delta P_{BC} \leq EP_{BC} \quad (1111\text{-}2)$$

$$\Delta P_{CD} \leq EP_{CD} \quad (1111\text{-}3)$$

$$\Delta P_{DA} \leq EP_{DA} \quad (1111\text{-}4)$$

$$\Delta Q_A = \{(OX_a - MX_{ai})^2 + (OY_a - MY_{ai})^2\}^{1/2} \quad (1141)$$

$$\Delta Q_B = \{(OX_b - MX_{bi})^2 + (OY_b - MY_{bi})^2\}^{1/2} \quad (1142)$$

$$\Delta Q_C = \{(OX_c - MX_{ci})^2 + (OY_c - MY_{ci})^2\}^{1/2} \quad (1143)$$

$$\Delta Q_D = \{(OX_d - MX_{di})^2 + (OY_d - MY_{di})^2\}^{1/2} \quad (1144)$$

$$\Delta Q_A \leq EQ_A \quad (1141\text{-}1)$$

$$\Delta Q_B \leq EQ_B \quad (1142\text{-}1)$$

$$\Delta Q_C \leq EQ_C \quad (1143\text{-}1)$$

$$\Delta Q_D \leq EQ_D \quad (1144\text{-}1)$$

Now, the above values will be described.

$MX_{ai}$ is the position of the center axis $10ai$ in the X-axis direction. $MY_{ai}$ is the position of the center axis $10ai$ in the Y-axis direction. $MX_{bi}$ is the position of the center axis $10bi$ in the X-axis direction. $MY_{bi}$ is the position of the center axis $10bi$ in the Y-axis direction. $MX_{ci}$ is the position of the center axis $10ci$ in the X-axis direction. $MY_{ci}$ is the position of the center axis $10ci$ in the Y-axis direction. $MX_{di}$ is the position of the center axis $10di$ in the X-axis direction. $MY_{di}$ is the position of the center axis $10di$ in the Y-axis direction. These are values calculated by the arithmetic control unit 140 based on the information from the imaging cameras 125, 135 such that the positions of the axes of the mutually facing blank holes 11A to 11D, 12A to 12D can coincide with each other, as described above.

$OX_a$ is the position of the axis of the worked hole 10A in the X-axis direction. $OY_a$ is the position of the axis of the worked hole 10A in the Y-axis direction. $OX_b$ is the position of the axis of the worked hole 103 in the X-axis direction. $OY_b$ is the position of the axis of the worked hole 10B in the Y-axis direction. $OX_c$ is the position of the axis of the worked hole 100 in the X-axis direction. $OY_c$ is the position of the axis of the worked hole 100 in the Y-axis direction. $OX_d$ is the position of the axis of the worked hole 10D in the X-axis direction. $OY_d$ is the position of the axis of the worked hole 10D in the Y-axis direction. These are values calculated by the arithmetic control unit 140 based on Equations (1101), (1111) to (1114), (1141) to (1144) and Inequalities (1111-1) to (1114-1), (1141-1) to (1144-1) above.

$P_{AB}$ is the designed axis-to-axis distance (pitch) between the worked hole 10A and the worked hole 103. $P_{BC}$ is the designed axis-to-axis distance (pitch) between the worked hole 10B and the worked hole 100. $P_{CD}$ is the designed axis-to-axis distance (pitch) between the worked hole 100 and the worked hole 10D. $P_{AD}$ is the designed axis-to-axis distance (pitch) between the worked hole 10A and the worked hole 10D. These are values inputted in advance in the arithmetic control unit 140.

$\Delta P_{AB}$ is the difference (pitch error) between the calculated axis-to-axis distance (pitch) between the axes of the worked hole 10A and the worked hole 10B and $P_{AB}$ mentioned above. $\Delta P_{BC}$ is the difference (pitch error) between the calculated axis-to-axis distance (pitch) between the axes of the worked hole 10B and the worked hole 10C and $P_{BC}$ mentioned above. $\Delta P_{CD}$ is the difference (pitch error) between the calculated axis-to-axis distance (pitch) between the axes of the worked hole 10C and the worked hole 10DC and $P_{CD}$ mentioned above. $\Delta P_{AD}$ is the difference (pitch error) between the calculated axis-to-axis distance (pitch) between the axes of the worked hole 10A and the worked hole 10D and $P_{AD}$ mentioned above. These are values calculated by the arithmetic control unit 140.

$\Delta Q_A$ is the length (amount of offset) between the center axis $10ai$ and the calculated axis of the worked hole 1-0A. $\Delta Q_B$ is the length (amount of offset) between the center axis $10bi$ and the calculated axis of the worked hole 10B. $\Delta Q_C$ is the length (amount of offset) between the center axis $10ci$ and the calculated axis of the worked hole 100. $\Delta Q_D$ is the length (amount of offset) between the center axis $10di$ and the calculated axis of the worked hole 10D. These are values calculated by the arithmetic control unit 140.

$EP_{AB}$ is a tolerance for the pitch error between the worked holes 10A, 10B. $EP_{BC}$ is a tolerance for the pitch error between the worked holes 10B, 10C. $EP_{CD}$ is a tolerance for the pitch error between the worked holes 10C, 10D. $EP_{AD}$ is a tolerance for the pitch error between the worked holes 10A, 10D. These are values inputted in advance in the arithmetic control unit 140.

$EQ_A$ is a tolerance for the amount of offset between the center axis $10ai$ and the axis of the worked hole 10A. $EQ_B$ is a tolerance for the amount of offset between the center axis $10bi$ and the axis of the worked hole 10B. $EQ_C$ is a tolerance for the amount of offset between the center axis $10ci$ and the axis of the worked hole 100. $EQ_D$ is a tolerance for the amount of offset between the center axis $10di$ and the axis of the worked hole 10D. These are values inputted in advance in the arithmetic control unit 140.

$WP_{AB}$ is a weight coefficient for $\Delta P_{AB}$ mentioned above. $WP_{BC}$ is a weight coefficient for $\Delta P_{BC}$ mentioned above. $WP_{CD}$ is a weight coefficient for $\Delta P_{CD}$ mentioned above. $WP_{AD}$ is a weight coefficient for $\Delta P_{AD}$ mentioned above. These are values greater than or equal to 0 set as appropriate in accordance with various conditions.

$WQ_A$ is a weight coefficient for $\Delta Q_A$ mentioned above. $WQ_B$ is a weight coefficient for $\Delta Q_B$ mentioned above. $WQ_C$ is a weight coefficient for $\Delta Q_C$ mentioned above. $WQ_D$ is a weight coefficient for $\Delta Q_D$ mentioned above. These are values greater than or equal to 0 set as appropriate in accordance with various conditions.

Here, assume for example that the tolerances $EP_{AB}$, $EP_{BC}$, $EP_{CD}$, $EP_{AD}$ for the pitch errors are each set at ±5 mm and the tolerances $EQ_A$, $EQ_B$, $EQ_C$, $EQ_D$ for the amounts of offset are each set at 2.5 mm, and that the pitch errors $\Delta P_{AB}$, $\Delta P_{BC}$, $\Delta P_{CD}$, $\Delta P_{AD}$ and the amounts of offset $\Delta Q_A$ to $\Delta Q_D$ which do not satisfy their respective Inequalities (1111-1) to (1114-1), (1141-1) to (1144-1) are obtained as a result of calculating $MX_{ai}$ to $MX_{di}$, $MY_{ai}$ to $MY_{di}$ mentioned above based on the information from the imaging cameras 125, 135 and calculating Equations (1101), (1111) to (1114), (1141) to (1144) mentioned above with the weight coefficients $WP_{AB}$, $WP_{BC}$, $WP_{CD}$, $WP_{AD}$, $WQ_A$ to $WQ_D$ each set at "1." In this case, the above values are calculated by gradually increasing (e.g. by 0.1) the weight coefficients $WP_{AB}$, $WP_{BC}$, $WP_{CD}$, $WP_{AD}$, $WQ_A$ to $WQ_D$ for the pitch errors $\Delta P_{AB}$, $\Delta P_{BC}$, $\Delta P_{CD}$, $\Delta P_{AD}$ and amounts of offset $\Delta Q_A$ TO $\Delta Q_D$ until they satisfy Inequalities (1111-1) to (1114-1), (1141-1) to (1144-1) (see Optimization Example 1 in Tables 1 to 4 below).

Also, assume for example that the pitch errors $\Delta P_{AB}$, $\Delta P_{BC}$, $\Delta P_{CD}$, $\Delta P_{AD}$ and the amounts of offset $\Delta Q_A$ TO $\Delta Q_D$ which do not satisfy their respective Inequalities (1111-1) to (1114-1), (1141-1) to (1144-1) are obtained as a result of calculating Equations (1101), (1111) to (1114), (1141) to (1144) mentioned above with the weight coefficients $WQ_A$ to $WQ_D$ for the amounts of offset $\Delta Q_A$ to $\Delta Q_D$ each set at "1" and the weight coefficients $WP_{AB}$, $WP_{BC}$, $WP_{CD}$, $WP_{AD}$ for the pitch errors $\Delta P_{AB}$, $\Delta P_{BC}$, $\Delta P_{CD}$, $\Delta P_{AD}$ each set at "0" in an attempt to reduce the amounts of offset $\Delta Q_A$ to $\Delta Q_D$ as much as possible, that is, to leave the removal stocks as much as possible. In this case, the above values are calculated by gradually increasing (e.g. by 0.1) the weight coefficients $WQ_A$ to $WQ_D$ for the pitch errors $\Delta P_{AB}$, $\Delta P_{BC}$, $\Delta P_{CD}$, $\Delta P_{AD}$ until they satisfy Inequalities (1111-1) to (1114-1), (1141-1) to (1144-1) (see Optimization Example 2 in Tables 1 to 4 below).

Figure 7:
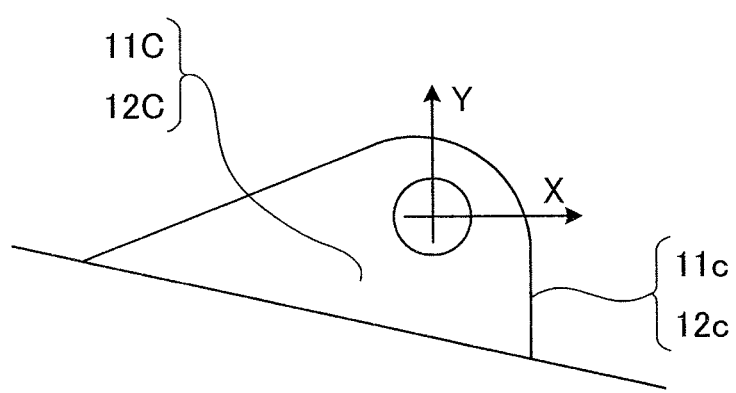
FIG. 7 is an explanatory view of the position of a worked hole formed in a flange portion.

Also, for example, as illustrated in FIG. 7, if the worked hole 100 is formed in each bracket portion 11c, 12c on a positive side relative to the blank hole 11C, 12C in the X-axis direction and the Y-axis direction (the rightward direction and the upward direction of FIG. 7), strength may possibly decrease. In this case, the above values are calculated such that Inequalities (1143-2), (1143-3) below are also satisfied (see Optimization Example 3 in Tables 1 to 4 below).

$$OX_c \leq MX_{ci} \qquad (1143\text{-}2)$$

$$OY_c \leq MY_{ci} \qquad (1143\text{-}3)$$

TABLE 1

| Position | Calculated Value | Optimization Example 1 | Optimization Example 2 | Optimization Example 3 |
|---|---|---|---|---|
| $MX_{ai}$ | 497.762 | | | |
| $MY_{ai}$ | 496.657 | | | |
| $MX_{bi}$ | 2502.737 | | | |
| $MY_{bi}$ | 1502.044 | | | |
| $MX_{ci}$ | 4497.585 | | | |
| $MY_{ci}$ | 2002.928 | | | |
| $MX_{di}$ | 7498.608 | | | |
| $MY_{di}$ | 499.319 | | | |
| $OX_a$ | | 498.866 | 498.471 | 498.562 |
| $OY_a$ | | 498.004 | 497.427 | 497.557 |
| $OX_b$ | | 2501.446 | 2502.026 | 2501.937 |
| $OY_b$ | | 1500.698 | 1501.275 | 1501.244 |
| $OX_c$ | | 4497.888 | 4497.732 | 4497.585 |
| $OY_c$ | | 2002.026 | 2002.413 | 2002.128 |
| $OX_d$ | | 7498.492 | 7498.463 | 7498.508 |
| $OY_d$ | | 500.221 | 499.835 | 500.119 |

Unit: mm

TABLE 2

| Axis-to-Axis Distance (Pitch) | Designed Value | Calculated Value | Optimization Example 1 | Optimization Example 2 | Optimization Example 3 |
|---|---|---|---|---|---|
| $P_{AB}$ | 2236.068 | | | | |
| $P_{BC}$ | 2061.553 | | | | |
| $P_{CD}$ | 3354.102 | | | | |
| $P_{AD}$ | 7000.000 | | | | |
| $\{(MX_{bi} - MX_{ai})^2 + (MY_{bi} - MY_{ai})^2\}^{1/2}$ | | 2242.928 | | | |
| $\{(MX_{ci} - MX_{bi})^2 + (MY_{ci} - MY_{bi})^2\}^{1/2}$ | | 2056.771 | | | |
| $\{(MX_{di} - MX_{ci})^2 + (MY_{di} - MY_{ci})^2\}^{1/2}$ | | 3356.632 | | | |
| $\{(MX_{ai} - MX_{di})^2 + (MY_{ai} - MY_{di})^2\}^{1/2}$ | | 7000.846 | | | |
| $\{(OX_b - OX_a)^2 + (OY_b - OY_a)^2\}^{1/2}$ | | | 2239.581 | 2240.808 | 2240.736 |
| $\{(OX_c - OX_b)^2 + (OY_c - OY_b)^2\}^{1/2}$ | | | 2058.424 | 2057.609 | 2057.547 |
| $\{(OX_d - OX_c)^2 + (OY_d - OY_c)^2\}^{1/2}$ | | | 3355.450 | 3356.081 | 3355.826 |
| $\{(OX_a - OX_d)^2 + (OY_a - OY_d)^2\}^{1/2}$ | | | 6999.627 | 6999.946 | 6999.946 |

Unit: mm

TABLE 3

| Axis-to-Axis Distance (Pitch) Error | Tolerance | Calculated Value | Optimization Example 1 | Optimization Example 2 | Optimization Example 3 |
|---|---|---|---|---|---|
| $EP_{AB}$ | ±5 | | | | |
| $EP_{BC}$ | ±5 | | | | |
| $EP_{CD}$ | ±5 | | | | |
| $EP_{AD}$ | ±5 | | | | |
| $\{(MX_{bi} - MX_{ai})^2 + (MY_{bi} - MY_{ai})^2\}^{1/2} - AB$ | | 6.860 | | | |
| $\{(MX_{ci} - MX_{bi})^2 + (MY_{ci} - MY_{bi})^2\}^{1/2} - BC$ | | −4.782 | | | |
| $\{(MX_{di} - MX_{ci})^2 + (MY_{di} - MY_{ci})^2\}^{1/2} - CD$ | | 2.530 | | | |

TABLE 3-continued

| Axis-to-Axis Distance (Pitch) Error | Tolerance | Calculated Value | Optimization Example 1 | Optimization Example 2 | Optimization Example 3 |
|---|---|---|---|---|---|
| $\{(MX_{ai} - MX_{di})^2 + (MY_{ai} - MY_{di})^2\}^{1/2} -$ AD | | 0.846 | | | |
| $\Delta P_{AB}$ | | | 3.513 | 4.740 | 4.668 |
| $\Delta P_{BC}$ | | | -3.129 | -3.944 | -4.006 |
| $\Delta P_{CD}$ | | | 1.348 | 1.979 | 1.724 |
| $\Delta P_{AD}$ | | | -0.373 | -0.054 | -0.054 |

Unit: mm

TABLE 4

| Amount of Offset | | Tolerance | Optimization Example 1 | Optimization Example 2 | Optimization Example 3 |
|---|---|---|---|---|---|
| $EQ_A$ | X-Axis Direction | 2.500 | | | |
| | Y-Axis Direction | 2.500 | | | |
| $EQ_B$ | X-Axis Direction | 2.500 | | | |
| | Y-Axis Direction | 2.500 | | | |
| $EQ_C$ | X-Axis Direction | 2.500 | | | |
| | Y-Axis Direction | 2.500 | | | |
| $EQ_D$ | X-Axis Direction | 2.500 | | | |
| | Y-Axis Direction | 2.500 | | | |
| $\Delta Q_A$ | $OX_a - MX_{ai}$ | | 1.104 | 0.709 | 0.800 |
| | $OY_a - MY_{ai}$ | | 1.347 | 0.770 | 0.900 |
| $\Delta Q_B$ | $OX_b - MX_{bi}$ | | -1.290 | -0.711 | -0.800 |
| | $OY_b - MY_{bi}$ | | -1.347 | -0.770 | -0.800 |
| $\Delta Q_C$ | $OX_c - MX_{ci}$ | | 0.302 | 0.146 | 0.000 |
| | $OY_c - MY_{ci}$ | | -0.902 | -0.516 | -0.800 |
| $\Delta Q_D$ | $OX_d - MX_{di}$ | | -0.116 | -0.145 | -0.100 |
| | $OY_d - MY_{di}$ | | 0.902 | 0.516 | 0.800 |

Unit: mm

As can be seen from Tables 1 to 4, even when the pitch error between the worked holes 10A, 10B (6.860 mm) exceeds its tolerance (±5 mm), the amount of offset can be reduced to or below the tolerance (2.5 mm) and the pitch error can also be reduced to or below the tolerance (i.e. to 3.513 mm), as illustrated in Optimization Example 1 above.

Further, as illustrated in Optimization Example 2 above, the pitch error (6.860 mm) between the worked holes 10A, 10B can of course be reduced to or below the tolerance (i.e. to 4.740 mm), and the amount of offset can also be reduced to a greater extent than in Optimization Example 1.

Furthermore, as illustrated in Optimization Example 3 above, the pitch error between the worked holes 10A, 10B (6.860 mm) can be reduced to or below the tolerance (i.e. to 4.668 mm) without positioning the worked hole 10C on the positive side relative to each blank hole 11C, 12C in the X-axis direction and the Y-axis direction (the rightward direction and the upward direction of FIG. 7), that is, without making $OX_c - MX_{ci}$, and $OY_c - MY_{ci}$ positive values. Thus, the decrease in strength of the worked hole 10C can be reduced.

After the arithmetic control unit 140 calculates the optimized positions of the worked holes 10A to 10D as described above, the imaging cameras 125, 135, which are attached to the spindles 124, 134, are changed to tools for cutting or the like such as milling cutters (S122 in FIG. 5).

Then, based on the above calculated results, the arithmetic control unit 140 actuates the drive motors 113, 126, 127, 128, 136, 137, 138 to cut the blank holes 11A to 112, 12A to 12D with the tools to expand their diameters, sc that the blank holes 11A to 11D, 12A to 12D are worked and adjusted into the worked holes 10A to 10D in the boom 10 (S123 in FIG. 5).

The boom 10 with the blank holes 11A to 11D, 12A to 12D worked and adjusted into the worked holes 10A to 10D as described above has all the pitch errors less than or equal to their respective tolerances. Hence, components such as hydraulic cylinders can be joined between the worked holes 10A to 10D without problems at all.

Thus, with the machine tool 100 according to this embodiment, even when the boom 10 has a pitch error greater than or equal to its tolerance, the worked holes 10A to 10D can be worked and adjusted to such optimized positions that all the pitch errors are less than or equal to their respective tolerances. In this way, defective products can be greatly reduced.

Second Embodiment

A second embodiment of the machine tool according to the present invention will be described with reference to FIGS. 8 to 11. Note that, for the same portions as those in the foregoing embodiment, the same reference signs as the reference signs used in the description of the foregoing embodiment will be used, and therefore description overlapping the description in the foregoing embodiment will be omitted.

Figure 8:
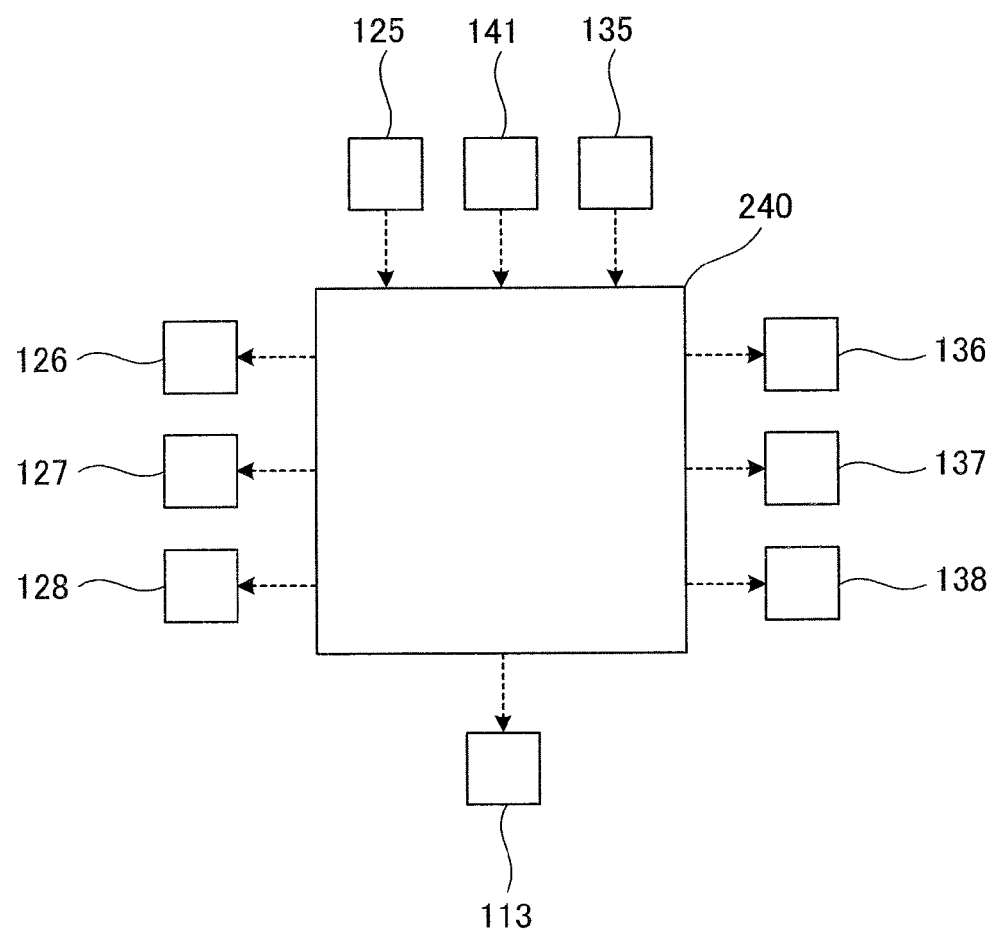
FIG. 8 is a control block diagram of a main part of a second embodiment in which the machine tool according to the present invention is applied to a horizontal boring and milling machine with counter spindles.

As illustrated in FIG. 8, the imaging cameras 125, 135 and the input unit 141 are electrically connected to an input part of an arithmetic control unit 240, which serves as arithmetic control means. An output part of the arithmetic control unit 240 is electrically connected to the drive motors 113, 126 to 128, 136 to 138.

The arithmetic control unit 24C is capable of controlling the actuation of the drive motors 113, 126 to 128, 136 to 138 based on information from the input unit 141 and information inputted in advance, and of performing arithmetic operation for controlling the actuation of the drive motors 113, 126, 127, 136, 137 based on information from the imaging cameras 125, 135 and information inputted in advance (details will be described later).

Next, description will be given of actuation of a machine tool according to this embodiment including the above arithmetic control unit 240.

As in the foregoing embodiment, after performing Steps S111, S112 described above, the input unit 141 inputs information into the arithmetic control unit 240 which instructs imaging of the protruding portions 11a, 11b, 11d, 12a, 12b, 12d and the bracket portions 11c, 12c of the plate members 11, 12 of the boom 10 as well as the blank holes 11A to 11D, 12A to 12D with the imaging cameras 125, 135.

Figure 9:
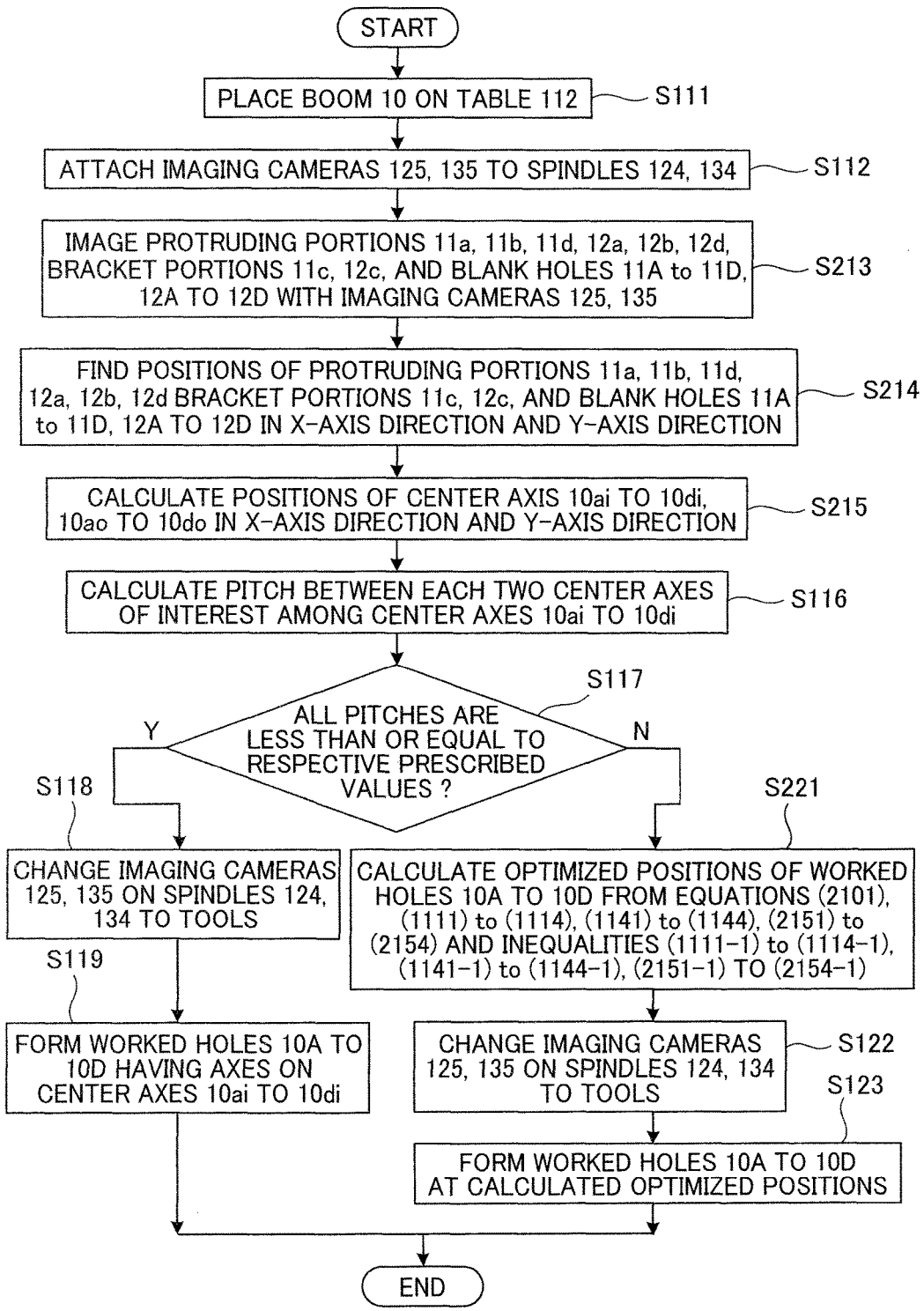
FIG. 9 is a flowchart of a main part of actuation of the horizontal boring and milling machine with counter spindles in the second embodiment.
Figure 10A:
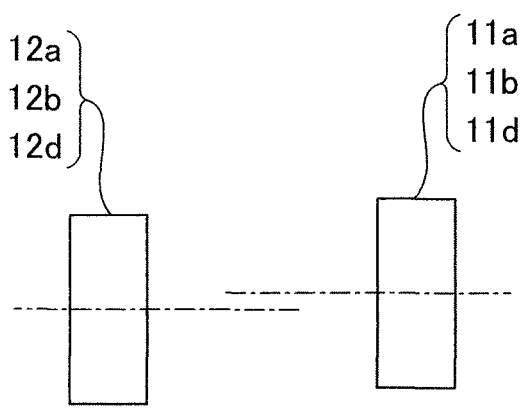
FIG. 10 is an explanatory view of the center axes of protruding portions.
Figure 10B:
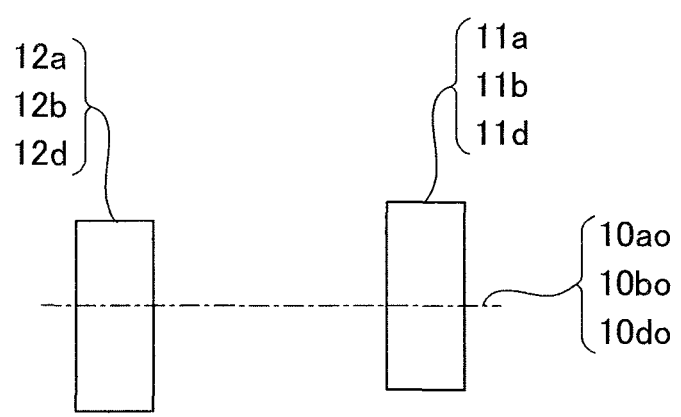
Figure 11:
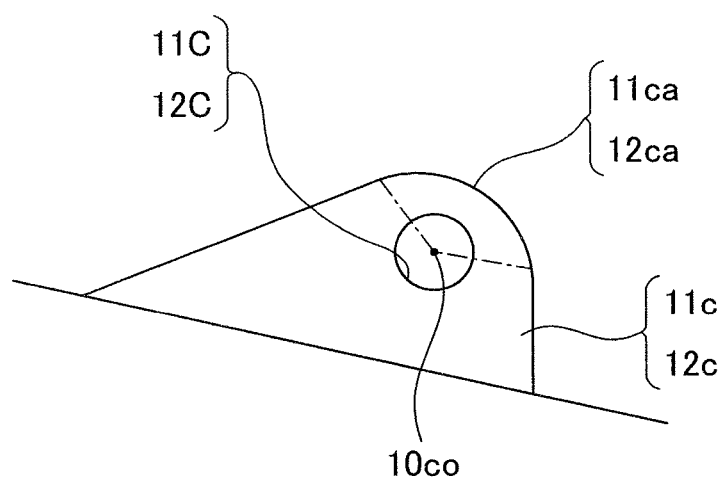
FIG. 11 is an explanatory view of round portions of flange portions and their center axes.

In response, the arithmetic control unit 240 actuates the drive motors 113, 126, 127, 136, 137 to move the table 112 in the X-axis direction and move the spindles 124, 134 in the Y-axis direction and the Z-axis direction such that the protruding portions 11a, 11b, 11d, 12a, 12b, 12d and the bracket portions 11c, 12c of the plate members 11, 12 of the boom 10 as well as the blank holes 11A to 11D, 12A to 12D can be imaged with the imaging cameras 125, 135 (S213 in FIG. 9).

Based on information from the imaging cameras 125, 135, the arithmetic control unit 240 finds the positions of the blank holes 11A to 11D, 12A to 12D in the plate members 11, 12 of the boom 10 in the X-axis direction and the Y-axis direction and the positions of the protruding portions 11a, 11b, 11d, 12a, 12b, 12d in the X-axis direction and the Y-axis direction. The arithmetic control unit 240 further finds the positions of the axes of round portions 11ca, 12ca of the protruding ends of the bracket portions 11c, 12c in the X-axis direction and the Y-axis direction (S214 in FIG. 9).

Then, the arithmetic control unit 240 calculates the positions of the center axes 10ai to 10di in the X-axis direction and the Y-axis direction as in the foregoing embodiment. In addition, the arithmetic control unit 240 calculates the positions, in the X-axis direction and the Y-axis direction, of such center axes that the mutually facing protruding portions 11a, 11b, 11d, 12a, 12b, 12d of the plate members 11, 12 can be coaxial with each other with the smallest amounts of movement, specifically, the positions, in the X-axis direction and the Y-axis direction, of center axes 10ao, 10bo, 10do of circular areas where the worked holes 10A, 10B, 10D can be formed (see FIG. 10). The arithmetic control unit 240 further calculates the positions, in the X-axis direction and the Y-axis direction, of such a center axis that the round portions 11ca, 12ca of the protruding ends of the mutually facing bracket portions 11c, 12c can be coaxial with each other with the smallest amounts of movement, specifically, the positions, in the X-axis direction and the Y-axis direction, of a center axis 10co of a circular area where the worked hole 10C can be formed (see FIG. 11) (S215 in FIG. 9).

Thereafter, as in the foregoing embodiment, the arithmetic control unit 240 calculates the pitch between each two center axes of interest among the center axes 10ai to 10di (S116 in FIG. 9). The arithmetic control unit 240 then determines whether or not all of these pitches are less than or equal to their respective prescribed values (tolerances) (S117 in FIG. 9).

If all of the pitches are less than or equal to their respective prescribed values (tolerances), Steps S118, S119 described above are performed as in the foregoing embodiment.

On the other hand, if even one of the pitches does not satisfy its prescribed value (tolerance), the arithmetic control unit 240 calculates minimized values satisfying Inequalities (1111-1) to (1114-1), (1141-1) to (1144-1) above and Inequalities (2151-1) to (2154-1) below based on Equation (2101) below, Equations (1111) to (1114), (1141) to (1144) above as well as Equations (2151) to (2154) below, that is, the arithmetic control unit 240 calculates optimized positions of the center axes 10ai to 10di in the X-axis direction and the Y-axis direction, in other words, optimized positions of the axes of the worked holes 10A to 10D (S221 in FIG. 9).

$$F(OX_a, OX_b, OX_c, OX_d, OY_a, OY_b, OY_c, OY_d) = (WP_{AB} \times \Delta P_{AB}^2) + (WP_{BC} \times \Delta P_{BC}^2) + (WP_{CD} \times \Delta P_{CD}^2) + (WP_{AD} \times \Delta P_{AD}^2) + (WQ_A \times \Delta Q_A^2) + (WQ_B \times \Delta Q_B^2) + (WQ_C \times \Delta Q_C^2) + (WQ_D \times \Delta Q_D^2) + (WT_A \times \Delta T_A^2) + (WT_B \times \Delta T_B^2) + (WT_C \times \Delta T_C^2) + (WT_D \times \Delta T_D^2)$$ (2101)

$$\Delta T_A = \{(OX_a - MX_{ao})^2 + (OY_a - MY_{ao})^2\}^{1/2}$$ (2151)

$$\Delta T_B = \{(OX_b - MX_{bo})^2 + (OY_b - MY_{bo})^2\}^{1/2}$$ (2152)

$$\Delta T_C = \{(OX_c - MX_{co})^2 + (OY_c - MY_{co})^2\}^{1/2}$$ (2153)

$$\Delta T_D = \{(OX_d - MX_{do})^2 + (OY_d - MY_{do})^2\}^{1/2}$$ (2154)

$$\Delta T_A \leq E_{TA}$$ (2151-1)

$$\Delta T_B \leq E_{TB}$$ (2151-2)

$$\Delta T_C \leq E_{TC}$$ (2151-3)

$$\Delta T_D \leq E_{TD}$$ (2151-4)

$MX_{ao}$ is the position of the center axis 10ao in the X-axis direction. $MY_{ao}$ is the position of the center axis 10ao in the Y-axis direction. $MX_{bo}$ is the position of the center axis 10bo in the X-axis direction. $MY_{bo}$ is the position of the center axis 10bo in the Y-axis direction. $MX_{co}$ is the position of the center axis 10co in the X-axis direction. $MY_{co}$ is the position of the center axis 10co in the Y-axis direction. $MX_{do}$ is the position of the center axis 10do in the X-axis direction. $MY_{do}$ is the position of the center axis 10do in the Y-axis direction. These are values calculated by the arithmetic control unit 240 based on the information from the imaging cameras 125, 135 such that the positions of the axes of the mutually facing protruding portions 11a, 11b, 11d, 12a, 12b, 12d can coincide with each other and the positions of the axes of the round portions of the protruding ends of the bracket portions 11c, 12c can coincide with each other, as described above.

$\Delta T_A$ is the length (amount of eccentricity) between the center axis 10ao and the calculated axis of the worked hole 10A. $\Delta T_B$ is the length (amount of eccentricity) between the center axis 10bo and the calculated axis of the worked hole 10B. $\Delta T_C$ is the length (amount of eccentricity) between the center axis 10co and the calculated axis of the worked hole 10C. $\Delta T_D$ is the length (amount of eccentricity) between the center axis 10do and the calculated axis of the worked hole 10D. These are values calculated by the arithmetic control unit 240.

$ET_A$ is a tolerance for the amount of eccentricity between the center axis 10ao and the axis of the worked hole 10A. $ET_B$ is a tolerance for the amount of eccentricity between the center axis 10bo and the axis of the worked hole 10B. $ET_C$ is a tolerance for the amount of eccentricity between the center axis 10co and the axis of the worked hole 10C. $ET_D$ is a tolerance for the amount of eccentricity between the center axis 10do and the axis of the worked hole 10D. These are values inputted in advance in the arithmetic control unit 240.

$WT_A$ is a weight coefficient for $\Delta T_A$ mentioned above. $WT_B$ is a weight coefficient for $\Delta T_B$ mentioned above. $WT_C$ is a weight coefficient for $\Delta T_C$ mentioned above. $WT_D$ is a weight coefficient for $\Delta T_D$ mentioned above. These are values greater than or equal to 0 set as appropriate in accordance with various conditions.

In sum, this embodiment takes into consideration not only the amounts of offset of the worked holes 10A to 10D relative to the blank holes 11A to 11D, 12A to 12D but also the amounts of eccentricity relative to the protruding portions 11a, 11b, 11d, 12a, 12b, 12d and the round portions of the bracket portions 11c, 12c.

After this arithmetic control unit 240 calculates the optimized positions of the worked holes 10A to 10D as in the foregoing embodiment, Steps S122, S123 described above are performed. As a result, the blank holes 11A to 11D, 12A to 12D can be worked and adjusted into the worked holes 10A to 10D in the boom 10.

Thus, for the worked holes 10A, 10B, 10D, the amounts of unevenness in the thicknesses of the protruding portions 11a, 11b, 11d, 12a, 12b, 12d in the radial direction can be optimized. For the worked hole 10C, the stock allowances for the protruding ends of the bracket portions 11c, 12c can be optimized.

Hence, with this embodiment, it is possible to achieve similar advantageous effects to those by the foregoing embodiment and, in addition, more effectively reduce the decrease in strength of the protruding portions 11a, 11b, 11d, 12a, 12b, 12d and the bracket portions 11c, 12c due to the formation of the worked holes 10A to 10D.

Other Embodiments

In the foregoing embodiments, the imaging cameras 125, 135 are used to input the information on the blank holes 11A to 11D, 12A to 12D in the plate members 11, 12 of the boom 10, the information on the protruding portions 11a, 11b, 11d, 12a, 12b, 12d, the information on the bracket portions 11c, 12c, and other relevant information into the arithmetic control units 140, 240. Note however that, as another embodiment, it is possible to use, for example, touch probes or the like in place of the imaging cameras 125, 135 to input the information on the blank holes 11A to 11D, 12A to 12D in the plate members 11, 12 of the boom 10, the information on the protruding portions 11a, 11b, 11d, 12a, 12b, 12d, the information on the bracket portions 11c, 12c, and other relevant information into the arithmetic control units 140, 240.

Also, the foregoing embodiments have described the cases where the present invention is applied to a table moving-type horizontal boring and milling machine with counter spindles. However, as another embodiment, it is possible to apply the present invention to, for example, a column moving-type horizontal boring and milling machine with counter spindles. In this case, too, similar advantageous effects to those by the foregoing embodiments can be achieved.

Also, the foregoing embodiments have described the cases where the mutually facing blank holes 11A to 11D, 12A to 12D in the plate members 11, 12 of the boom 10 of the excavator are worked and adjusted into the worked holes 10A to 10D by cutting the blank holes 11A to 11D, 12A to 12D to expand their diameters. However, the present invention is not limited to these cases and is applicable just as the foregoing embodiments to cases where n blank holes (n is an integer greater than or equal to 3) formed in a workpiece are to be worked and adjusted into worked holes by cutting the blank holes to expand their diameters.

In the case of such a workpiece, the arithmetic control means calculates optimized positions of the worked holes from minimized values satisfying Inequalities (110-1), (120-1), (130-1), (140-1), (150-1) below based on Equations (100), (110), (120), (130), (140), (150) below.

[Formula 2]

$$Fn(OX_1, OX_2, \ldots, OX_n, OY_1, OY_2, \ldots OY_n) = \quad (100)$$

$$\frac{1}{2} * \sum_{k=1}^{n} \sum_{\substack{m=1 \\ m \neq k}}^{n} (WP_{km} * \Delta P_{km}^2 + WX_{km} * \Delta X_{km}^2 + WY_{km} * \Delta Y_{km}^2) +$$

$$\sum_{k=1}^{n} (WQ_k * \Delta Q_k^2 + WT_k * \Delta T_k^2)$$

$$\Delta P_{km} = \sqrt{(OX_m - OX_k)^2 + (OY_m - OY_k)^2} - P_{km} \quad (110)$$

$$\Delta P_{km} \leq EP_{km} \quad (110\text{-}1)$$

$$\Delta X_{km} = (OX_m - OX_k) - (OX_{ms} - OX_{ks}) \quad (120)$$

$$\Delta X_{km} \leq EX_{km} \quad (120\text{-}1)$$

$$\Delta Y_{km} = (OY_m - OY_k) - (OY_{ms} - OY_{ks}) \quad (130)$$

$$\Delta Y_{km} \leq EY_{km} \quad (130\text{-}1)$$

$$\Delta Q_k = \sqrt{(OX_k - MX_{ki})^2 + (OY_k - MY_{ki})^2} \quad (140)$$

$$\Delta Q_k \leq EQ_k \quad (140\text{-}1)$$

$$\Delta T_k = \sqrt{(OX_k - MX_{ko})^2 + (OY_k - MY_{ko})^2} \quad (150)$$

$$\Delta T_k \leq ET_k \quad (150\text{-}1)$$

In the above equations and inequalities, $MX_{ki}$ is the position of the center axis of a blank hole $G_k$ in the X-axis direction; $MY_{ki}$ is the position of the center axis of the blank hole $G_k$ in the Y-axis direction; $MX_{ko}$ is the position, in the X-axis direction, of the center axis of a circular area where a worked hole $H_k$ is capable of being formed by working and adjusting the blank hole $G_k$; $MY_{ko}$ is the position, in the Y-axis direction, of the center axis of the circular area where the worked hole $H_k$ is capable of being formed by working and adjusting the blank hole $G_k$; $OX_k$ is the position of the axis of the worked hole $H_k$ in the X-axis direction; $OY_k$ is the position of the axis of the worked hole $H_k$ in the Y-axis direction; $OX_{ks}$ is the designed position of the axis of the worked hole $H_k$ in the X-axis direction; $OY_{ks}$ is the designed position of the axis of the worked hole $H_k$ in the Y-axis direction; $OX_m$ is a position of an axis of the worked hole $H_m$ in the X-axis direction, $OY_m$ is a position of the axis of the worked hole $H_m$ in the Y-axis direction, $OX_{ms}$ is the designed position of the axis of a worked hole $H_m$ in the X-axis direction; $OY_{ms}$ is the designed position of the axis of the worked hole $H_m$ in the Y-axis direction; $P_{km}$ is the designed pitch between the worked holes $H_k$, $H_m$; $\Delta P_{km}$ is the calculated pitch error between the worked holes $H_k$, $H_m$; $\Delta X_{km}$ is the axis-to-axis error between the worked holes $H_k$, $H_m$ in the X-axis direction; $\Delta Y_{km}$ is the axis-to-axis error between the worked holes $H_k$, $H_m$ in the Y-axis direction; $\Delta Q_k$ is the amount of offset between the center axis of the blank hole $G_k$ and the calculated axis of the worked hole $H_k$; $\Delta T_k$ is the length between the center axis of the circular area where the worked hole $H_k$ is capable of being formed and the calculated axis of the worked hole $H_k$; $EP_{km}$ is a tolerance for the pitch error between the worked holes $H_K$, $H_m$; $EX_{km}$ is a tolerance for the axis-to-axis error between the worked holes $H_k$, $H_m$ in the X-axis direction; $EY_{km}$ is a tolerance for the axis-to-axis error between the worked holes $H_k$, $H_m$ in the Y-axis direction; $EQ_k$ is a tolerance for the amount of offset between the center axis of the blank hole $G_k$ and the axis of the worked hole $H_k$; $ET_k$ is a tolerance for the length between the center axis of the circular area where the worked hole $H_k$ is capable of being formed and the axis of the worked hole $H_k$; $WP_{km}$ is a weight coefficient for $\Delta P_{km}$; $WX_{km}$ is a weight coefficient for $\Delta X_{km}$; $WY_{km}$ is a weight coefficient for $\Delta Y_{km}$; $WQ_k$ weight coefficient for $\Delta Q_k$; and $WT_k$ is a weight coefficient for $\Delta T_k$.

Here, $\Delta P_{km}$ mentioned above is the error in the axis-to-axis distance between the worked holes $H_k$, $H_m$. On the other hand, $\Delta X_{km}$, $\Delta Y_{km}$ mentioned above are the axis-to-axis errors between the worked holes $H_k$, $H_m$ in the X- and Y-axis directions, and are values employed in a case where the error between the axes of the worked holes $H_k$, $H_m$ in the X-axis direction and the error between the axes of the worked holes $H_k$, $H_m$ in the Y-axis direction are considered individually or only one of these errors in the X-axis direction and the Y-axis direction should be considered.

In short, the foregoing first and second embodiments are cases where n is set at "4," the amount of offset between the worked holes 10A, 100 and the amount of offset between the worked holes 10B, 10D are omitted, $WX_{km}$, $WY_{km}$ are set at "0," and, in the foregoing first embodiment, $WT_k$ is set at "0."

As described above, the present invention can handle various cases by optionally selecting, when necessary, those worked holes between which the pitch error is desired to be less than or equal to the tolerance, and optionally selecting various conditions (setting weight coefficients for unnecessary conditions at "0") in accordance with the state of the workpiece.

INDUSTRIAL APPLICABILITY

Even in the case of a workpiece with a pitch error greater than or equal to its tolerance between worked holes, the machine tool according to the present invention can work and adjust the worked holes to such optimized positions that all the pitch errors can be less than or equal to their respective tolerances. In this way, defective products can be greatly reduced. The machine tool according to the present invention can therefore be utilized significantly beneficially in various working industries.

REFERENCE SIGNS LIST 10 boom
10ai to 10di, 10ao to 10do center axis
10A to 10D worked hole
11, 12 plate member
11a, 11b, 11d, 12a, 12b, 12d protruding portion
11c, 12c bracket portion
11ca, 12ca round portion
11A to 11D, 12A to 12D blank hole
13 joint member
100 machine tool
111 bed
112 table
113 drive motor (for X-axis movement)
121, 131 bed
122, 132 column
123, 133 spindle head
124, 134 spindle
125, 135 imaging camera
126, 136 drive motor (for Y-axis movement)
127, 137 drive motor (for Z-axis movement)
128, 138 drive motor (for cutting)
140, 240 arithmetic control unit
141 input unit

The invention claimed is:

1. A machine tool for working and adjusting n blank holes, n is an integer greater than or equal to 3, formed in a workpiece into worked holes by cutting the blank holes to expand diameters thereof, comprising:
a table on which the workpiece is placed;
a spindle capable of detachably holding a tool for cutting the blank holes in the workpiece and measurement means for measuring positions of the blank holes in the workpiece where the tool and the measurement means are capable of being changed from one another;
a spindle drive means for rotationally driving the spindle;
a relative movement means for moving at least one of the table and the spindle to move the tool and the measurement means relative to the workpiece in an X-axis direction, a Y-axis direction, and a Z-axis direction; and
arithmetic control unit that
controls the relative movement means such that the positions of the blank holes in the workpiece are measured with the measurement means held on the spindle,
calculates positions of center axes of the blank holes based on information on the positions of the blank holes measured with the measurement means,
calculates a distance between each two center axes of interest among the center axes, and
in a case where at least one of the calculated distances does not satisfy a prescribed value, the arithmetic unit calculates optimized positions of the worked holes from minimized values satisfying Inequalities: $\Delta P_{km} \leq EP_{km}$, $\Delta X_{km} \leq EX_{km}$, $\Delta Y_{km} \leq EY_{km}$, $\Delta Q_k \leq EQ_k$, $\Delta T_k \leq ET_k$ below based on Equations:

$$Fn(OX_1, OX_2, \ldots, OX_n, OY_1, OY_2, \ldots OY_n) =$$
$$\frac{1}{2} * \sum_{k=1}^{n} \sum_{\substack{m=1 \\ m \neq k}}^{n} (WP_{km} * \Delta P_{km}^2 + WX_{km} * \Delta X_{km}^2 + WY_{km} * \Delta Y_{km}^2) +$$
$$\sum_{k=1}^{n} (WQ_k * \Delta Q_k^2 + WT_k * \Delta T_k^2);$$

$$\Delta P_{km} = \sqrt{(OX_m - OX_k)^2 + (OY_m - OY_k)^2} - P_{km};$$
$$\Delta X_{km} = (OX_m - OX_k) - (OX_{ms} - OX_{ks});$$
$$\Delta Y_{km} = (OY_m - OY_k) - (OY_{ms} - OY_{ks});$$
$$\Delta Q_k = \sqrt{(OX_k - MX_{ki})^2 + (OY_k - MY_{ki})^2} \text{ ; and}$$
$$\Delta T_k = \sqrt{(OX_k - MX_{ko})^2 + (OY_k - MY_{ko})^2},$$

controlling the spindle drive means and the relative movement means to cut the blank holes with the tool held on the spindle such that the worked holes are formed at the calculated optimized positions of the worked holes,
where
$MX_{ki}$ is a position of a center axis of a blank hole $G_k$ in the X-axis direction,
$MY_{ki}$ is a position of the center axis of the blank hole $G_k$ in the Y-axis direction, $MX_{ko}$ is a position, in the X-axis direction, of a center axis of a circular area where a worked hole $H_k$ is capable of being formed by working and adjusting the blank hole $G_k$, $MY_{ko}$ is a position, in the Y-axis direction, of the center axis of the circular area where the worked hole $H_k$ can be formed by working and adjusting the blank hole $G_k$, $OX_k$ is a position of an axis of the worked hole $H_k$ in the X-axis direction, $OY_k$ is a position of the axis of the worked hole $H_k$ in the Y-axis direction, $OX_{ks}$ is a designed position of the axis of the worked hole $H_k$ in the X-axis direction, $OY_{ks}$ is a designed position of the axis of the worked hole $H_k$ in the Y-axis direction, $OX_m$ is a position of an axis of the worked hole $H_m$ in the X-axis direction, $OY_m$ is a position of the axis of the worked hole $H_m$ in the Y-axis direction, $OX_{ms}$ is a designed position of the axis of a worked hole $H_m$ in the X-axis direction, $OY_{ms}$ is a designed position of the axis of the worked hole $H_m$ in the Y-axis direction, $P_{km}$ is a designed pitch between the worked holes $H_k$, $H_m$, $P_{km}$ is a calculated pitch error between the worked holes $H_k$, $H_m$, $\Delta X_{km}$ is an axis-to-axis error between the worked holes $H_k$, $H_m$ in the X-axis direction, $\Delta Y_{km}$ is an axis-to-axis error between the worked holes $H_k$, $H_m$ in the Y-axis direction, $\Delta Q_k$ is an amount of offset between the center axis of the blank hole $G_k$ and the calculated axis of the worked hole $H_k$, $\Delta T_k$ is a length between the center axis of the circular area where the worked hole $H_k$ is capable of being formed and the calculated axis of the worked hole $H_k$, $EP_{km}$ is a tolerance for the pitch error between the worked holes $H_K$, $H_m$, $EX_{km}$ is a tolerance for the axis-to-axis error between the worked holes $H_k$, $H_m$ in the X-axis direction, $EY_{km}$ is a tolerance for the axis-to-axis error between the worked holes $H_k$, $H_m$ in the Y-axis direction, $EQ_k$ is a tolerance for the amount of offset between the center axis of the blank hole $G_k$ and the axis of the worked hole $H_k$, $ET_k$ is a tolerance for the length between the center axis of the circular area where the worked hole $H_k$ is capable of being formed and the axis of the worked hole $H_k$, $WP_{km}$ is a weight coefficient for $\Delta P_{km}$, $WX_{km}$ is a weight coefficient for $\Delta X_{km}$, $WY_{km}$ is a weight coefficient for $\Delta Y_{km}$, $WQ_k$ is a weight coefficient for $\Delta Q_k$, and $WT_k$ is a weight coefficient for $\Delta T_k$.

2. The machine tool according to claim 1, wherein the workpiece is a boom of an excavator.

3. The machine tool according to claim 1, wherein the machine tool is a horizontal boring and milling machine with counter spindles.

4. The machine tool according to claim 1, wherein the measurement means is any one of an imaging camera and a touch sensor.

* * * * *